C. E. EVANS & A. A. HEISLER.
FISHING DEVICE.
APPLICATION FILED AUG. 18, 1908.
934,150.
Patented Sept. 14, 1909.
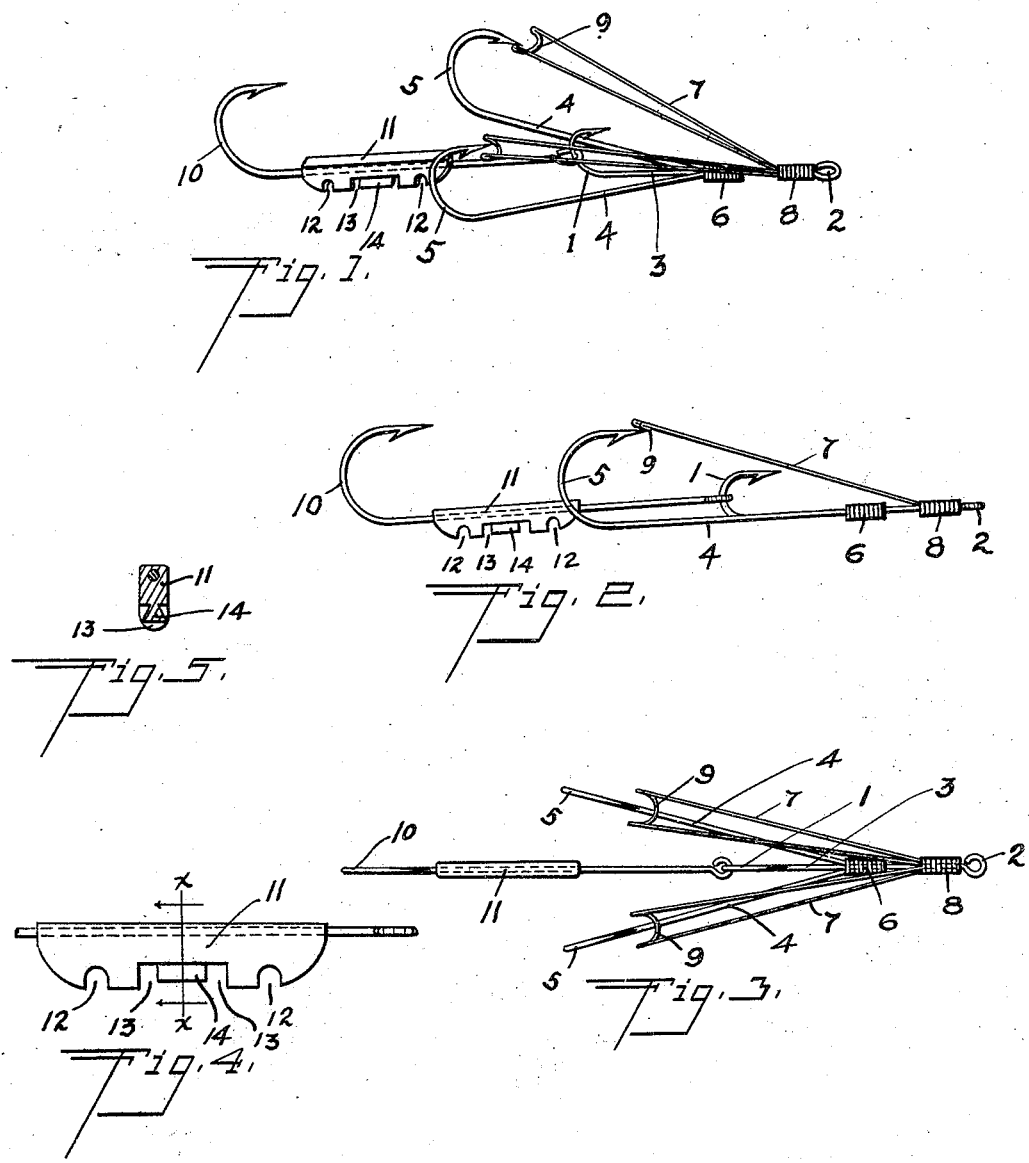
Charles E. Evans,
Arthur A. Heisler. Inventors.
Witnesses:
Roy G. Kratz
Jno. J. Sistek.
By David O. Barnell,
Attorney.

UNITED STATES PATENT OFFICE.

CHARLES E. EVANS AND ARTHUR A. HEISLER, OF COUNCIL BLUFFS, IOWA.

FISHING DEVICE.

934,150.  Specification of Letters Patent.  Patented Sept. 14, 1909.

Application filed August 18, 1908. Serial No. 449,178.

*To all whom it may concern:*

Be it known that we, CHARLES E. EVANS and ARTHUR A. HEISLER, citizens of the United States, and residents of Council Bluffs, in the county of Pottawattamie and State of Iowa, have invented certain new and useful Improvements in Fishing Devices, of which the following is a specification.

Our invention relates to devices for fishing by trolling and casting, and more particularly to that class of devices commonly known as weedless tandem bait-casting hooks.

It is the object of our invention to provide in a device of this class a simple and efficient arrangement of the parts whereby the bait may be securely fastened thereto and pass through the water in a life-like manner, the points of the hooks be prevented from catching on weeds or the like, and the relation of the hooks and bait be such that there will be the greatest probability of catching a fish which strikes at the bait.

A construction embodying our invention is shown in the accompanying drawings, in which—

Figure 1 is a perspective view of the device, Fig. 2 is a side elevation of the same, Fig. 3 is a plan view thereof, Fig. 4 is a detail side elevation of the weight formed on the trailer hook, and Fig. 5 is a detail transverse section of the weight on the line $x$—$x$ of Fig. 4.

In the construction shown we provide a small leader hook 1 having a shank 3 and an eye 2 to which the casting or trolling line may be connected. At about the center of the shank 3 the shanks 4 of the hooks 5 are connected thereto by a wire-lashed and soldered joint 6. The shanks 4 extend divergently rearward from the joint 6 to points considerably behind the hook 1, and the hooks 5 are of much larger size than the hook 1. The forward ends of the wires 7 forming the weed-guards for the hooks 5 are attached by means of the wire-lashed and soldered joint 8 to the shank 1 just behind the eye 2. From the joint 8 the said wires 7 extend in pairs toward the points of the hooks 5, each pair of the wires diverging slightly, and the ends thereof adjacent to the point of the hook being connected by an integral forwardly-extending U-shaped portion 9 passing around the point of the hook, as clearly shown in the several figures of the drawings. On account of the difference in size of the hook 1 and the hooks 5, and the divergent arrangement of the latter hooks, the guards for the said hooks 5 protect the hook 1 sufficiently to prevent the catching of weeds thereon.

The trailer-hook 10 is connected with the hook 1 by passing the eye thereof over the barb of the latter hook and around onto the rearward part of the main bend of the hook. On the shank of the trailer-hook a weight 11 is formed by casting the same around the shank, the said weight preferably being of greater depth than width, having a flat top and sides, curved front and rear ends, and in the bottom edge provided with two or more rounded transverse notches 12. Near the center of the weight is a larger transverse notch 13, into which extends a lug 14 having longitudinal V-shaped grooves at the sides thereof, so that the transverse section of the lug has the form of a dove-tail, as clearly shown in Fig. 5.

In securing a bait upon the device the nose portion of the bait is impaled by the hook 1 and the body of the bait is laid out along the top of the shank of the hook 10 over the weight 11, being secured on top of the weight by means of a cord or cords, or an elastic band passing around the weight and bait and through one or more of the notches 12 and 13. If desired, an endless elastic band may be employed, a portion of the band being looped over the lug 14, the band then being passed up over the bait and down upon the opposite side thereof, and the end of the band then being looped over the lug 14 so as to lie in the V-groove at the opposite side thereof from the portion of the band first engaged therewith.

By the arrangement of the notches 12 and 13 in different longitudinal portions of the weight, the location of the means employed for attaching the bait may be varied to suit the size of the bait. For example, if the bait used were a small frog, the length thereof including the legs being approximately the same as the length of the trailer-hook, then the body of the frog would lie so far forward on the weight that it would be desirable to use the front notch 12 in securing the body upon the weight. With a much larger frog, where the body would reach to the rearward end of the weight and the legs extend out behind the hook 10, the rear notch 12 would preferably be used in securing the body on the weight, while for medium sized frogs either end of the notch 13 may be employed or the fastening connected with the lug 14, as before described.

By reference to the drawings it will be seen that by the arrangement of the hooks it is almost impossible for a fish to strike at the bait without encountering one of the hooks, for if coming from either side the strike will be directed at the main body of the bait and one of the hooks 5 will be engaged, and if coming from the rear and the strike is directed at the rearward part of the bait the trailer-hook 10 will be engaged. It will also be apparent that by the divergence of the hooks 5 from the general longitudinal axis of the device, the same will be deflected away from the weeds or the like so that there will be little probability of the unguarded trailer-hook catching on such obstructions.

Now, having described our invention, what we claim and desire to secure by Letters Patent is:

1. A fishing device, comprising two hooks arranged in tandem, the front hook adapted to hold the nose of a bait, means on the rear hook for use in securing the body of the bait thereto, and hooks connected with the shank of the front hook and extending divergently rearward therefrom so that the latter hooks lie alongside the body of the bait behind the said front hook and in front of the rear hook.

2. A fishing device, comprising two hooks arranged in tandem, the front hook adapted to hold the nose portion of a bait, a weight formed on the shank of the rear hook, there being recesses formed in different longitudinal portions of the weight for the purpose described, and hooks connected with the front hook and extending divergently rearward to points at each side of the longitudinal axis of the device and between the front and rear hooks.

3. A fishing device, comprising two hooks arranged in tandem and adapted to retain respectively the nose and body portions of a bait, hooks connected with the shank of the front hook and extending divergently rearward therefrom to positions at each side and in front of the rear hook, and weed-guards arranged to protect the points of the divergent hooks.

4. A fishing device, comprising a small hook provided with a shank and means for attaching the same to a line, two larger hooks having shanks connected with the shank of the small hook, the latter hooks lying in divergent planes arranged symmetrically to the plane of the small hook and extending behind the small hook, a trailer-hook connected with the small hook and lying in the same plane therewith and extending to a point behind the divergent hooks, and weed-guards consisting of pairs of wires connected with the shank of the small hook near the front end thereof and extending divergently rearward and upward to positions near the points of the divergent hooks, said guards extending at such an angle with the shanks of the hooks that the point of the small hook is below the guards.

5. A device for fishing, comprising a pair of hooks connected with a common shank and arranged to provide a space between them, means arranged between and in front of the said hooks for holding the nose portion of a bait, a hook arranged behind said pair of hooks, said latter hook having a shank extending between the pair of hooks, and means for connecting the body portion of a bait with said shank.

6. In a fishing device, a hook, a weight secured on the shank thereof and depending therefrom, the said weight having notches formed in the lower edge thereof, and a lug projecting into one of said notches, the lug having grooves in the sides thereof for the purpose described.

In testimony whereof we have hereunto subscribed our names in the presence of two witnesses.

CHARLES E. EVANS.
ARTHUR A. HEISLER.

Witnesses:
D. O. BARNELL,
C. R. McKAY.